April 28, 1931.    C. H. NIXON    1,802,774
INSECT TRAP
Filed July 18, 1927    2 Sheets-Sheet 1
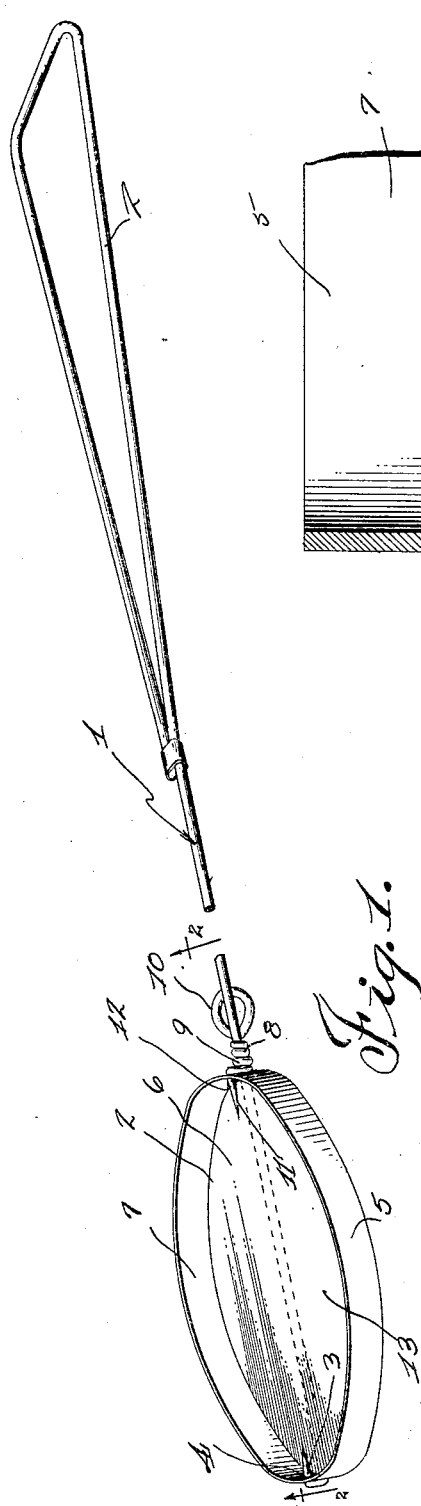
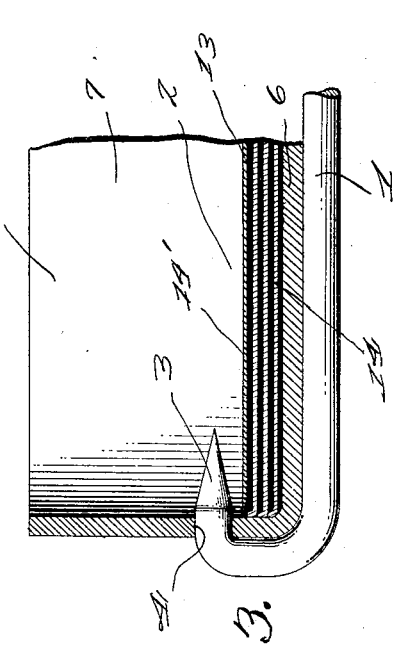
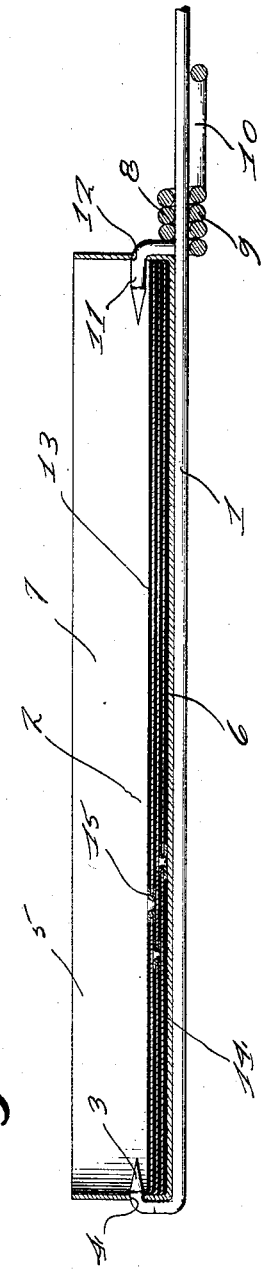
Charles H. Nixon, Inventor

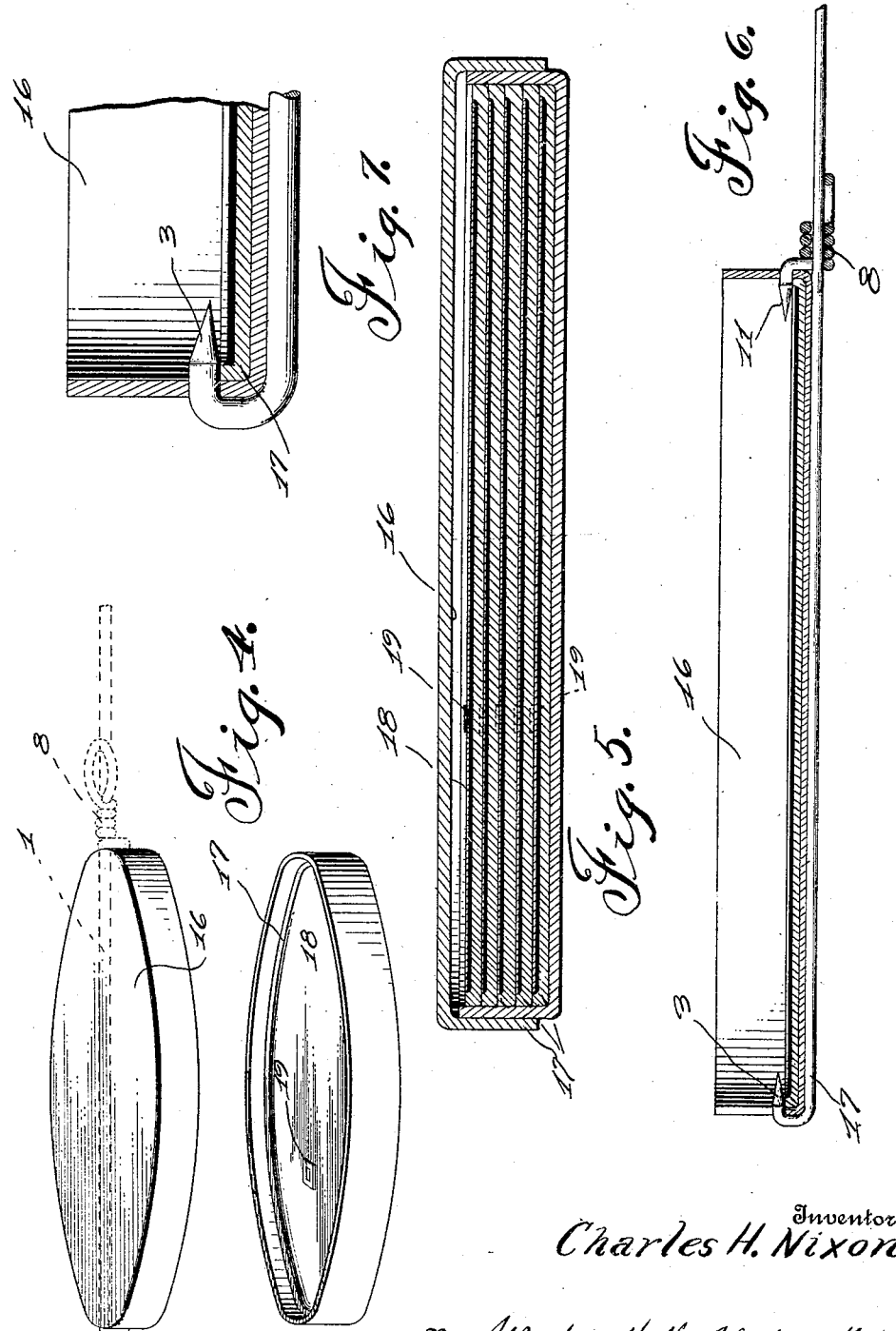

Patented Apr. 28, 1931

1,802,774

UNITED STATES PATENT OFFICE

CHARLES H. NIXON, OF DETROIT, MICHIGAN

INSECT TRAP

Application filed July 18, 1927. Serial No. 206,634.

The invention relates to insect traps and more particularly to an improved fly catcher.

The primary object of the present invention is to provide a device of this character which is simple in construction, light in weight, efficient in operation and relatively cheap to manufacture.

The invention further contemplates the provision of a device enabling the flies and insects settling upon walls, windows, screens or other articles to be trapped without staining or marring the surface engaged.

A further object of the invention is to provide a fly catcher having means for supporting a plurality of superposed sheets of paper coated with a non-flowing entangling preparation and means for extracting said sheets when desired.

The invention contemplates other objects and many novel details of construction as will be more fully described and particularly pointed out in the accompanying drawings wherein, Figure 1 is a perspective view of the device embodying my invention, Figure 2 is a sectional view on the line 2—2 of Figure 1, Figure 3 is an enlarged fragmentary sectional view, Figure 4 is a perspective view showing a modified form of the invention, Figure 5 is a central section through the passage.

Figure 6 is a sectional view showing the cover of the package positioned upon the frame, Figure 7 is an enlarged fragmentary sectional view of the construction shown in Figure 6.

Referring now to the drawings, the numeral 1 designates a wire frame having a handle portion 2 at one end, and terminating in a tapered hook return portion 3 at the opposite end arranged to project through an aperture 4 formed in the container 5. The container is constructed of a relatively inexpensive material so that it may be replaced at frequent intervals without excessive cost and is preferably formed of paper, card board or any suitable material having the required rigidity to maintain the shape illustrated in the drawings. As shown this body portion is preferably, although not necessarily, cylindrical in contour and is formed with a substantially flat bottom 6 terminating in a circumferentially projecting flange 7. For detachably mounting the body portion 5 upon the frame so that the latter may be readily interchanged, I provide a member 8 slidably mounted upon the frame 1 and preferably formed of a strip of wire coiled about the frame as indicated at 9, and terminating at one end in a loop 10 constituting a handle portion and at the opposite end in a tapered prong 11 arranged to project through an aperture 12 formed in the flange 7 diametrically opposite the aperture 4. Thus it will be apparent that the connection between the container 5 and frame will permit a slight pivotal movement of the container about the prongs 3 and 11 so that the container will readily and automatically align itself with the contacting surface and have an extended area of contact therewith. Arranged in superposed relation within the container 5 is a plurality of sheets of paper 13 coated with a non-flowing entangling preparation. As shown this paper is preferably flanged at its periphery to prevent the preparation, and insects trapped thereon from coming in contact with the flange 7 of the container. In practice, the inner surface of the bottom 6 of the container is coated with a sticky entangling substance and covered with a thin paper disk 14. As shown this disk is placed directly upon the entangling material and the opposite surface thereof is also coated with a like material. This method is continued until the desired number of disks are placed within the container. In order to prevent the entangling substance from soaking through the container, the latter may be coated with any suitable non-absorbing substance and a suitable cover 14' treated in a like manner, may be placed upon the uppermost disk. For conveniently removing the disks from the container after the same have served their purpose, each of the disks as well as the cover 14' is provided with an eyelet 15 and any suitable appliance may be used for engaging the eyelet to remove the disk from the container.

Figures 4, 5, 6 and 7 show a modified form of the invention in which the container is shown in the form of a package having a removable cover 16. As shown, the package contains a series of flanged disks 17, each disk being coated with an entangling substance and provided with a cover 18 having suitable eyelets 19 therein permitting a removal of the cover. In use one of the disks 17 is removed from the package and placed within the flanged cover 16, which in turn is mounted upon a frame substantially similar to the frame 1 in the same manner as the container 5. A shown the disk 17 is held in position within the container by means of the hook portion 3 formed on one end of the frame and the prong 11 formed on the member 8. The cover 18 may then be removed from the disk and the device is ready for use.

In operation, the fly or insect is covered by the container and agitated into flight, the entangling substance immediately intercepts this flight and traps the fly or insect without marring or coming in contact with the surface. It will further be noted that the device may be adequately used for trapping flies upon a fixture or protrusion other than a flat surface by scooping or swinging the trap in close proximity to the fly while forcing a flight.

While in particularizing upon the advantages and features of the present invention, particular stress has been placed upon the association of a plurality of applications of entangling preparation within the container many of the objects of the invention may be accomplished in a construction wherein a single sheet of material having adhesive properties is placed in the container and the invention therefore contemplates such an arrangement.

What I claim as my invention is:

1. In an insect trap, a frame, a container formed with a projecting flange having a relatively soft striking surface, means arranged within said container for trapping the insect, and means associated with said frame and engageable with said flange at substantially diametrically opposite points permitting a pivotal movement of the container about the frame.

2. In an insect trap, a frame terminating at one end in a hooked portion and at the opposite end in a handle portion, a container formed with a relatively soft projecting flange apertured to receive said hooked portion, a member slidably mounted upon said frame having a prong arranged to project through said flange diametrically opposite the hooked portion aforesaid, and means within said container for trapping the insects.

3. In an insect trap, a member provided with means for trapping an insect, a frame for said member comprising a handle portion, and means slidably mounted upon said frame and engageable with the said member permitting a pivotal movement of the latter about the said frame.

4. In combination, a pair of members adapted to co-operate with each other to form a package for enclosing insect destroying means, and a handle engageable with either of the said members to form an insect destroying device.

5. In an insect trap, an insect destroying member including a container, a handle for said container, means pivotally connecting said container to the handle, said means including a pintle upon the handle engageable with one wall of the container and a second pintle slidably mounted upon the handle and engageable with the container at a point diametrically opposite the pintle aforesaid.

6. In an insect trap, an insect destroying member including a container, a handle for said container, pintles upon said handle engageable with the container at diametrically opposite points permitting movement of the container relative to the handle, and an insect destroying member seated upon the base of the container and held in place by the pintles aforesaid.

In testimony whereof I affix my signature.

CHARLES H. NIXON.